United States Patent [19]

Miller

[11] 4,324,981

[45] Apr. 13, 1982

[54] LIGHT TRANSMISSION LOAD CONTROL SYSTEM

[75] Inventor: Glen E. Miller, Redondo, Wash.

[73] Assignee: The Boeing Company, Seattle, Wash.

[21] Appl. No.: 152,265

[22] Filed: May 21, 1980

[51] Int. Cl.³ .............................................. G02B 27/00

[52] U.S. Cl. ...................................... 250/551; 307/311

[58] Field of Search ........................ 250/551; 307/311; 310/25

[56] References Cited

U.S. PATENT DOCUMENTS 2,445,535 7/1948 Parsons et al. .

2,990,507 6/1961 Nuffer .

3,700,972 10/1972 Bates .................................. 361/191

3,931,514 1/1976 Patterson .

4,074,142 2/1978 Jackson .............................. 250/551

*Primary Examiner*—David C. Nelms

*Assistant Examiner*—Darwin R. Hostetter

*Attorney, Agent, or Firm*—David G. Pursel

[57] ABSTRACT

A light transmission load control system including a light responsive load controller for controlling a load setable in two states in response to optical impulses generated by an optical impulse generator. The optical impulse generator includes a light-emitting device for emitting optical impulses in response to electrical impulses produced by an electrical impulse generator. In its simplest form, the electrical impulse generator has a single moving part for controlling and indicating the state in which the load is set.

13 Claims, 4 Drawing Figures

FIG. 1
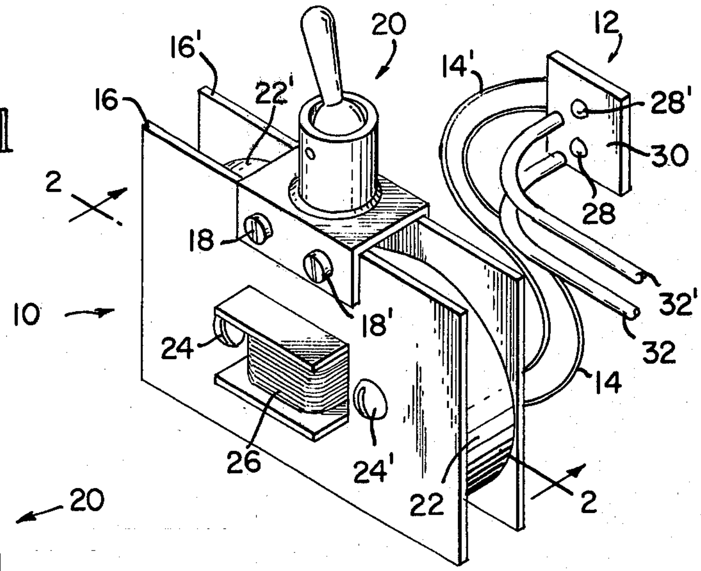
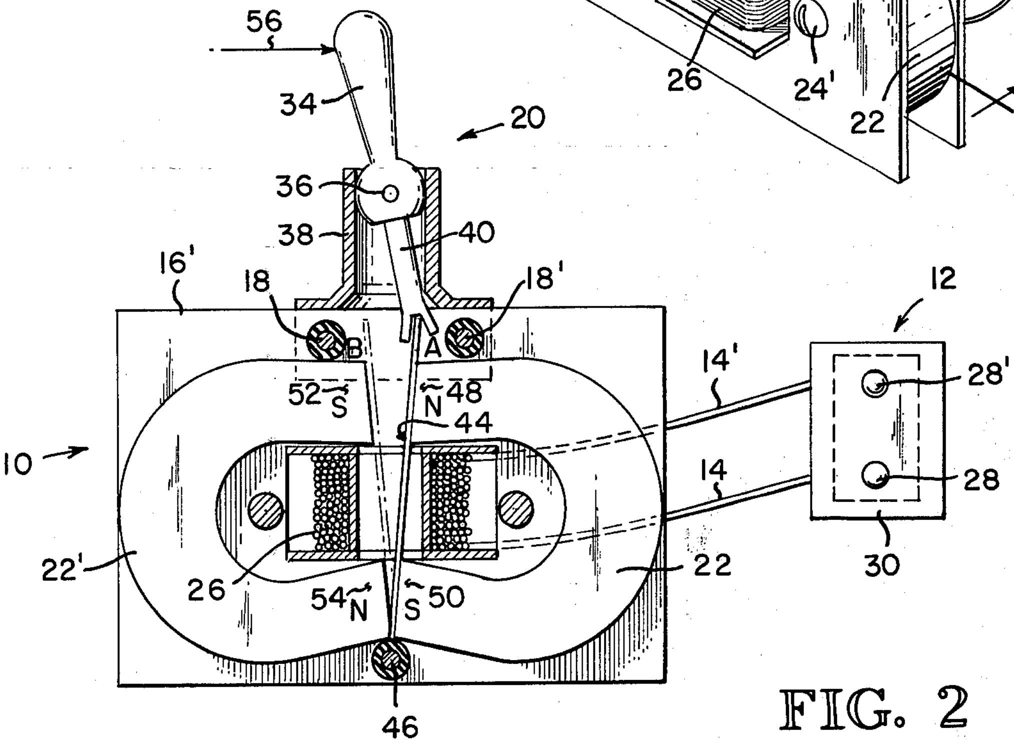
FIG. 2
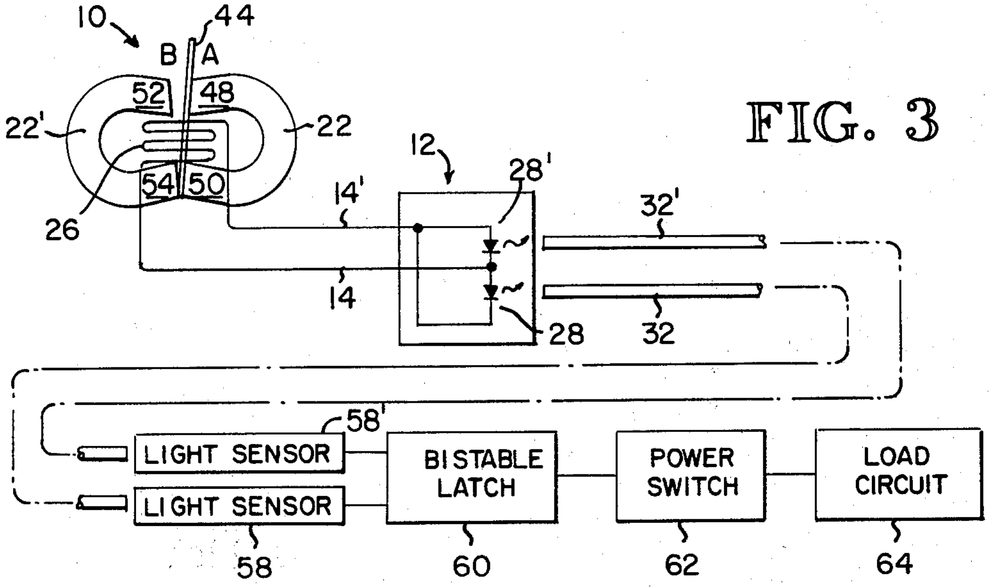
FIG. 3

LIGHT TRANSMISSION LOAD CONTROL SYSTEM

BACKGROUND OF THE INVENTION

This invention relates to electrical control apparatus and, more particularly, to electrical control apparatus including an optical impulse generator and a light responsive circuit for controlling an electrical load.

As is appreciated by those skilled in the art, it is often desirable to transfer information or control signals by light energy rather than by electrical energy, especially when the constraints of the operating environment preclude using conventional electrical information transfer systems. For example, high voltage switching circuits use optical fibers and light transmission techniques to electrically isolate a low power switching circuit from a high voltage load. The same electrical isolation property of fiber optic systems makes them valuable in patient monitoring instruments for preventing a patient from being inadvertently connected to a source of electrical power. The optical fibers' light weight and their immunity to electrical interference and nuclear radiation are properties which make fiber optics systems especially useful in weapons systems and aircraft control systems where high reliability and survivability are critical. Light transmission or fiber optics systems are also ideal for use in explosive and inflammable environments in order to avoid the hazards associated with conventional electrical circuits.

Lighting control systems are another important application of fiber optics. In large office buildings, tons of copper wire are typically used to interconnect lighting loads with their respective control switches. Copper is an expensive and critical material and should be conserved whenever possible. One step toward conserving the use of copper involves substituting a fiber optic control system that uses light-weight, inexpensive optical fibers instead of copper control wiring.

Fiber optic systems transfer control signals and transmit other information by passing light, usually in impulse form, through optical fibers from one point to another. The light impulse is generated by an optical impulse generator. At the receiving end of the optical fibers, circuitry responsive to the light pulse transforms the pulse into electrical energy for controlling other electrical or mechanical devices. No electrical current is transmitted along the fibers. In some applications, however, optical fibers may not be required, for example where the light impulses from the optical impulse generator can be provided directly to the light responsive circuitry, or by an arrangement or combination of lenses, prisms and mirrors.

Optical impulse generators typically are made up of two cooperative assemblies or circuits. The first is a device for producing an impulse of electrical energy, or an electrical impulse generator. The electrical impulse generated thereby is conveyed to the second assembly which includes a light-emitting device for transforming the electrical energy into light energy.

An example of one type of electrical impulse generator is a mechanical apparatus having a spring loaded transmitter for converting an actuating motion into a mechanical impulse. The mechanical impulse is applied to a piezoelectric crystal which transforms the mechanical pressure into an electrical impulse at an output. The electrical impulse which is produced by this method is typically one having high voltage and low current characteristics. The output obtained is therefore suitable for exciting a high voltage low current light emitter, most commonly a neon bulb. A piezoelectric crystal is generally unsatisfactory for most electrical impulse generator applications, however, because the voltage generated by the crystal cannot be varied at the output. As a consequence, the variety of light-emitting devices which can be used with a generator equipped with a piezoelectric crystal is severely limited and, in most practical cases, such a generator is suitable for use only with neon bulb light emitters. Such generators typically cannot be used with improved solid state semiconductor light emitters which possess higher coupling efficiences than neon bulbs. Furthermore, such generators have limited or even no capacity to drive multiple light-emitting devices. Additionally, such generators typically operate as one pulse-on, one pulse-off switches which give no indication of the present state of a system, especially of the state in which the load is set. If the switch is in one compartment, and the load is located in a remote compartment out of view of the operator, the operator will have no indication of the state to which he has set the load when he depresses the switch.

Therefore, it is an object of this invention to provide a light tranmission load control system which controls and indicates the state in which the load is set.

Another object of this invention is to provide a light transmission load control system including an improved electrical impulse generator adaptable for use in combination with a light emitter which provides optical impulses to control an optically responsive load controller.

A further object of this invention is to provide such an improved electrical impulse generator having a multi-position switch capable of generating multiple electrical impulses, and indicating the impulse generated on the basis of switch position.

A further object of this invention is to provide such an improved electrical impulse generator having an electrical output that is adjustable so that it is usable with various light emitters having desirable coupling efficiences.

Still another object of this invention is to provide such an improved electrical impulse generator having only one moving part.

SUMMARY OF THE INVENTION

This invention accomplishes these and other objects by providing a light transmission load control system including an optical impulse generator which is optically coupled to a light responsive load controller for controlling an electrical load. According to one preferred embodiment of the invention, the optical impulse generator includes an electromagnetic electrical impulse generator electrically connected to a light-emitting device. When the electrical impulse generator is mechanically activated to command the electrical load to a particular state, an electrical impulse is produced and is coupled to the light-emitting device, or light emitter. The light emitter responds to the electrical impulse by generating a light signal that is representative of the state to which the load is commanded to switch. The electrical impulse generator includes two C-shaped magnets positioned facing each other with their polarities reversed. A coil of wire is mounted between the magnets and a ferromagnetic armature is movably positioned within the coil, toggleable between a first position where it bridges the poles of one magnet and a second position where it bridges the poles of the other magnet. When the armature is moved from the first position to the second position, the lines of flux through the armature reverse direction, inducing a first electrical impulse, or voltage pulse of one polarity in the coil. Conversely, when the armature is moved from the second position to the first position, a second voltage pulse of an opposite polarity is induced in the coil. The first and second electrical impulses are presented across output terminals of the coil. The output terminals of the coil are connected to a light emitter which is responsive to the electrical impulses and converts the respective electrical impulses to impulses of light. The light emitter produces one light signal when the armature is moved from the first position to the second position, and a different light signal when the armature is moved from the second position back to the first position. The respective light signals so produced are optically coupled to light sensors which transform the respective light signals into corresponding electrical signals. These electrical signals set or clear a bi-stable latch which in turn controls a power switch or a load circuit.

In some applications it is desirable to provide a switch assembly for toggling the armature from one position to the other. However, in its simplest form, the electromagnetic electrical impulse generator involves only one moving part; namely, the armature.

By changing the number of windings which make up the coil, the coil impedance and the voltage impulses developed by the electromagnetic electrical impulse generator are variable at the output, thereby permitting the generator to be configured for use with a light emitter having a certain input power requirement, and configured differently for use with another light emitter having a dissimilar input power requirement. The variety of output voltages thus obtainable also permits multiple light emitters to be driven in series or parallel configuration from a single electromagnetic electrical impulse generator.

In an alternate embodiment, the coil of wire may include two or more individual coils of wire, each having a set of output terminals whereby multiple light emitters may be driven by a single generator. Since no external electrical power source is required in order to generate the optical impulses, the optical impulse generator can be installed at a remote location where electrical power is inaccessible.

This invention permits the use of small, inexpensive, light-weight optical fibers instead of heavy, expensive copper wire in control circuits. The identical unambiguous control functions performed now by impulsed low-voltage control circuits can be performed by fiber optic control systems in a cost effective manner. In addition, a fiber optic control system offers improved reliability because there are no springs and no electrical contacts to fail. The electronics associated with this fiber optic control system are easily mass-produced as integrated circuits and should be much cheaper and more reliable than the electromechanical relays commonly used in the equivalent impulsed low-voltage control circuits. The electrical transient produced by actuating the fiber optic control circuit is confined to the switch itself since there is no associated wiring to serve as a radiator. This is a particularly valuable feature of the invention for control of power in areas such as aircraft and office buildings where digital computer electronics are used. It is not uncommon for large information errors to be induced into computer circuits, for example, when a conventional lighting switch is actuated.

These and other features, objects, and advantages of the present invention will become apparent from the detailed description and claims to follow, taken in conjunction with the accompanying drawings in which like parts bear like reference numerals.

BRIEF DESCRIPTION OF THE DRAWINGS

FIG. 1 is a perspective view of an optical impulse generator according to this invention;

FIG. 2 is a section taken along line 2—2 in FIG. 1;

FIG. 3 is a schematic diagram of the electrical control system of this invention.

DETAILED DESCRIPTION OF THE DRAWINGS

Figure 4:
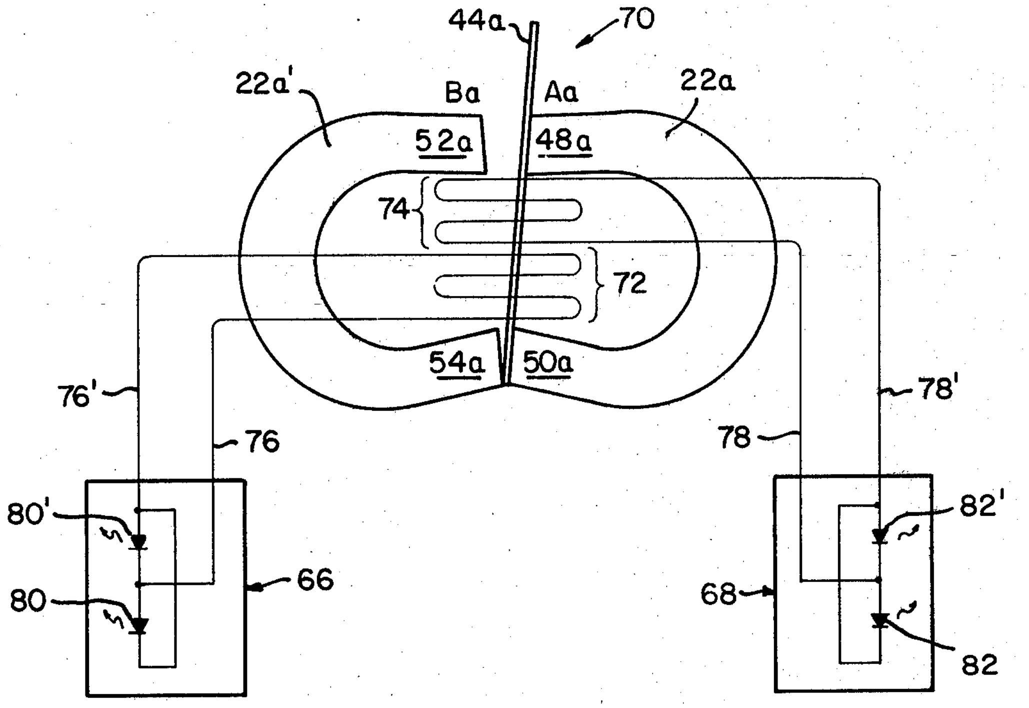
FIG. 4 is generally similar to FIG. 3, depicting a second preferred embodiment of the optical impulse generator of this invention.

Referring first to FIG. 1 of the drawings, the illustrated optical impulse generator includes an electromagnetic electrical impulse generator (generally referenced by numeral 10) and a light emitter (generally referenced by numeral 12). Generator 10 is electrically connected to light emitter 12 by a pair of wires 14 and 14'. In the illustrative embodiment of FIG. 1, generator 10 includes two parallel housing plates 16 and 16' manufactured from a non-ferromagnetic material. Fasteners 18 and 18' secure the switch assembly 20 to the housing plates. Two C-shaped magnets 22 and 22' are retained between the housing plates by mounting bolts 24 and 24'. Coil of wire 26 is positioned between the C-shaped magnets and has output terminals connected to electrical wires 14 and 14'. In the example, light emitter 12 includes light-emitting diodes 28 and 28', mounted on mounting block 30. However, it is understood that other solid state and gaseous light sources are usable and may be preferred in some applications. The light-emitting diodes are electrically connected to the electrical impulse generator 10 by wires 14 and 14'. In this example, optical fibers 32 and 32' are optically coupled to the light-emitting diodes to receive the light emitted from them. However, in some applications the optical fibers may not be required. In these instances, the light impulses from the optical impulse generator can be provided directly to the light responsive circuitry, or by an arrangement or combination of lens, prisms and mirrors.

Referring now to FIG. 2, the electromagnetic electrical impulse generator 10 includes a manually movable lever 34, pivotally mounted by pin 36 to switch casing 38. Switch arm 40 extends from lever 34 and terminates at the other end in a forklike projection. The forked end of switch arm 40 engages the upper end of armature 44 which is supported hingeably at its lower end. Armature 44 is fabricated from ferromagnetic material, such as silicon steel, that is characterized as having low retentivity and high permeability. Armature 44 reciprocates alternately within coil 26 between C-shaped magnets 22 and 22', which are arranged such that unlike poles are facing each other. In one example, magnet 22 has a north pole 48 and a south pole 50 and magnet 22' has a south pole 52 and a north pole 54, as shown in FIG. 2.

When armature 44 is in position A, as shown in FIG. 2, the armature bridges magnetic poles 48 and 50 and completes the magnetic flux path around magnet 22.

The lines of flux leave north pole 48 and are concentrated along armature 44 and converge into south pole 50. When an external force 56 is applied to lever 34, armature 44 is toggled from position A to position B by switch arm 40. In position B, armature 44 bridges poles 52 and 54 of magnet 22'. The lines of flux now leave pole 54 and are concentrated along armature 44 and converge into pole 52. As is readily apparent, the direction of the lines of flux through the armature reverses as the armature moves from position A to position B. When the lines of flux reverse, a voltage pulse of one polarity is induced in coil of wire 26 and appears across wires 14 and 14'. When the armature is moved back from position B to position A, the reversal in the direction of the lines of flux causes a voltage pulse opposite in polarity to be induced in coil 26 and appear across wires 14 and 14'. It will be appreciated that the polarity of the voltage pulse which appears across wires 14 and 14' indicates the position to which the armature is being moved.

The amplitude of the induced voltage in the coil is proportional to the rate of change of flux reversal in the armature as it moves between position A and position B. In this example, when external force 56 is applied to lever 34, the forked end of switch arm 40 moves the armature away from magnet 22. As the armature is attracted by magnet 22' it rapidly snaps into position B. The effect of this high-speed snap action is to induce a relatively large voltage impulse in coil 26. When a force opposite to that of force 56 is applied to lever 34, the armature is moved from position B to position A with a similar snap action and a similar voltage, opposite in polarity, is induced into coil 26.

An experimental model similar to the electromagnetic electrical impulse generator shown in FIG. 1 and FIG. 2 typically delivered electrical pulses one millisecond wide with an amplitude of 120 milliamperes into typical light-emitting diode loads.

FIG. 3 shows the electrical control systems of this invention wherein electromagnetic electrical impulse generator 10 is shown connected to light emitter 12 by wires 14 and 14'. The anode electrode of diode 28' is connected to the cathode electrode of diode 28 and the anode electrode of diode 28 is connected to the cathode electrode of diode 28'. Wire 14' is connected to the cathode electrode of diode 28' and the anode electrode of diode 28. Wire 14 is connected to the anode electrode of diode 28' and the cathode electrode of diode 28. As has been explained earlier, when armature 44 is moved from one position to another, a transient difference of potential appears between wires 14 and 14'. When wire 14' is positive with respect to wire 14, diode 28' is forward biased and emits a light impulse. When wire 14 is positive with respect to wire 14', diode 28 is forward biased and emits a light impulse. Depending upon whether armature 44 is moving from position A to B or vice versa, either wire 14 or 14' will be positive with respect to the other and either diode 28' or diode 28 will emit a pulse of light.

The light emitted by diode 28 is coupled into optical fiber 32 and is transmitted to light sensor 58. The light emitted by diode 28' is coupled into optical fiber 32' and is transmitted to light sensor 58'. In response to the presence of light at the end of one of the optical fibers, the associated light sensor provides an electrical signal which is provided to bi-stable latch 60. Bi-stable latch 60 may be any switch capable of being electrically pulsed into either of two states, such as an electronic bi-stable multi-vibrator. Bi-stable latch 60 is designed such that an electrical signal from one of the light sensors, for example light sensor 58', will cause the output signal of latch 60 to go to a low voltage level. Conversely, an electrical signal from light sensor 58 will cause the output signal from latch 60 to go to a high voltage level. The electrical output of bi-stable latch 60 could be connected directly to a load circuit or, if necessary, connected first to power switch 62 which in turn drives load circuit 64.

A second preferred embodiment of the electromagnetic electrical impulse generator of this invention is illustrated in FIG. 4 wherein elements corresponding to those already illustrated and described with respect to the FIG. 3 electromagnetic electrical impulse generator are referenced with the same reference numerals with the suffix letter "a," and accordingly these elements are not described further hereinafter. The FIG. 4 electromagnetic electrical impulse generator is generally similar to the FIG. 3 electromagnetic electrical impulse generator except that a plurality of light emitters 66 and 68 are driven by a single electromagnetic impulse generator 70. Light emitters 66 and 68 are similar in all respects to light emitter 12. The coil disposed between magnets **22*a* and 22'*a* includes a first set of windings 72 and a second set of windings 74. Light emitter 66 is connected by leads 76 and 76' to first set of windings 72 and light emitter 68 is connected by leads 78 and 78' to second set of windings 74. As described earlier, when armature 44*a* is moved from one position to another, a transient difference of potential appears across the leads connecting the light emitters to the generator. When wire 76' is positive with respect to wire 76, diode 80' is forward biased and emits a light impulse. Likewise, when wire 78' is positive with respect to wire 78, diode 82' is forward biased and emits a light impulse. Conversely, when wire 76 is positive with respect to wire 76', diode 80 is forward biased and emits a light impulse. When wire 78 is positive with respect to wire 78', diode 82 is forward biased and emits a light impulse. Accordingly, it is understood that the direction of movement of armature 44*a* between positions Aa and Ba will determine which of the diodes in light emitters 66 and 68** will emit an impulse of light.

The example described above involves two light emitters which are controlled by a single electromagnetic electrical impulse generator but, according to the invention, additional light emitters can also be controlled by the same generator merely by providing additional sets of windings connected respectively to additional light emitters. Furthermore, the number of turns of wire in any set of windings is selectable to provide an electrical impulse of a predetermined amplitude and duration, thus permitting the electromagnetic electrical impulse generator to be configurable for use with a variety of light emitters having dissimilar input power requirements.

Although two preferred embodiments of the invention have been illustrated and described herein, variations will become apparent to one of ordinary skill in the art. For example, referring to FIG. 2, it will be appreciated that in its simplest form all of the functions of the electrical impulse generator are achieved without switch assembly 20. In this basic embodiment, armature 44 is capable of being moved from position A to position B and vice versa and may be the preferred configuration for many applications which require the high reliability and low cost associated with a generator having only one moving part. However, in applications where a switch mechanism is desired, other switch assemblies such as a rocker or a slide switch mechanism may be preferred. Accordingly, the invention is not to be limited to the specific embodiment illustrated and described herein, and the true scope and spirit of the invention are to be determined by reference to the appended claims.

The embodiments of the invention in which an exclusive property or privilege is claimed are defined as follows:

1. Apparatus for controlling an electrical load settable in at least two states, comprising: optically responsive load control means for setting the load in a first state responsive to presentation of a first optical impulse and setting the load in a second state responsive to presentation of a second optical impulse; and optical impulse generator means operatively associated with said load control means for presenting said first optical impulse and said second optical impulse to said load control means in alternate sequence, and including means for controlling the occurrences of said first and second optical impulses and for indicating which of said optical impulses is presented to indicate the state in which the load is set.

2. The apparatus of claim 1, wherein said optical impulse generator means include light-emitting means for emitting a first optical impulse responsive to presentation of a first electrical impulse of a first polarity and emitting a second optical impulse responsive to presentation of a second electrical impulse of a polarity opposite from said first electrical impulse, electrical impulse generator means operatively associated with said light-emitting means for presenting said first electrical impulse and said second electrical impulse to said light-emitting means in alternate sequence and including control and indicating means for controlling the occurrences of said first electrical impulse and said second electrical impulse and for indicating which of said electrical impulses is presented to said light-emitting means.

3. The apparatus of claim 2, wherein said electrical impulse generator means include means establishing a magnetic field, coil means having first and second output terminals and disposed within said magnetic field, and said control and indicating means including armature means movable bi-directionally within said field to present said first and second electrical impulses across said output terminals when moved in a first direction and a second direction, respectively, said armature means including a portion for accepting opposite forces to move said armature means in said first and second directions and visible to provide an indication of the impulse presented.

4. The apparatus of claim 3, wherein said means establishing a magnetic field include means forming two pairs of opposite magnetic poles spaced apart such that each pole of one pair is opposed to a pole of the other pair of opposite polarity, said coil means located between said pairs, and wherein said armature means further include switch means constituting said portion, and an armature movable by said switch means within said coil means for producing a first electrical impulse therein of a first polarity when said armature is moved by said switch means from a first position where it bridges the poles of one pair to a second position where it bridges the poles of the other pair, and producing a second electrical impulse of an opposite polarity therein when said armature is moved by said switch means from said second position to said first position, said first and second electrical impulses occurring across said first and second output terminals for presentation to said light-emitting means.

5. The apparatus of claim 4, wherein said coil means include at least one coil of wire having a number of windings selected to provide electrical impulses of predetermined amplitude and duration.

6. The apparatus of claim 2, 3, 4 or 5, wherein said light-emitting means include a first light source and a second light source adapted to emit a first optical impulse and a second optical impulse responsive to presentation of said first electrical impulse and said second electrical impulse, respectively.

7. The apparatus of claim 1, wherein said optically responsive load control means include first light sensor means for providing a first electrical signal reponsive to said first optical impulse and having an output terminal, and second light sensor means for providing a second electrical signal responsive to said second optical impulse and having an output terminal; bistable latch means having an output terminal, and a first input terminal, connected to the output terminal of said first sensor means, and a second input terminal connected to the output terminal of said second sensor means, said bistable latch means operable for providing a first stable voltage level at its output terminal in response to the appearance of said first electrical signal at its first input terminal and providing a second stable voltage level at its output terminal in response to the appearance of said second electrical signal at its second input terminal; power switch means connected to the output terminal of said bistable latch means and having an output terminal connectable to a load circuit and responsive to presentation of said first stable voltage level for setting the load in a first state and responsive to presentation of said second voltage level for setting the load in a second state.

8. Optical impulse generating apparatus for producing a first optical impulse and a second optical impulse in alternate sequence, comprising: light-emitting means for emitting the first optical impulse responsive to presentation of a first electrical impulse of a first polarity and emitting the second optical impulse responsive to presentation of a second electrical impulse of a polarity opposite from said first electrical impulse; electrical impulse generator means operatively associated with said light-emitting means for presenting said first electrical impulse and said second electrical impulse to said light-emitting means in alternate sequence and including control and indicating means for controlling the occurrences of said first electrical impulse and said second electrical impulse and for indicating which of said electrical impulses is presented to said light-emitting means.

9. The apparatus of claim 8, wherein said electrical impulse generator means include means establishing a magnetic field, coil means having first and second output terminals and disposed within said magnetic field, and said control and indicating means including armature means movable bi-directionally within said field to present said first and second electrical impulses across said output terminals when moved in a first direction and a second direction, respectively, said armature means including a portion for accepting opposite forces to move said armature means in said first and second directions and visible to provide an indication of the impulse presented.

10. The apparatus of claim 9, wherein said means establishing a magnetic field include means forming two pairs of opposite magnetic poles spaced apart such that each pole of one pair is opposed to a pole of the other pair of opposite polarity, said coil means located between said pairs, and wherein said armature means further include switch means constituting said portion and an armature movable by said switch means within said coil means for producing a first electrical impulse therein of a first polarity when said armature is moved by said switch means from a first position where it bridges the poles of one pair to a second position where it bridges the poles of the other pair, and producing a second electrical impulse of an opposite polarity therein when said armature is moved by said switch means from said second position to said first position, said first and second electrical impulses occurring across said first and second output terminals for presentation to said light-emitting means.

11. The apparatus of claim 10, wherein said coil means include at least one coil of wire having a number of windings selected to provide electrical impulses of predetermined amplitude and duration.

12. The apparatus of claim 8, 9, or 10, wherein said light-emitting means include first and second light sources adapted to emit first and second optical impulses responsive to presentation of said first and second electrical impulses respectively.

13. A method for controlling a load settable in at least two states, comprising the steps of: alternately presenting first and second optical impulses to an optically responsive load controller adapted to set the load in a first state and a second state responsive to presentation of said first and second optical impulses, respectively; controlling the occurrences of said first and second optical impulses and indicating which of said optical impulses is presented to indicate in which state the load is set.

* * * * *